May 20, 1969 L. W. ERATH 3,445,769
METHOD AND APPARATUS FOR IN-CIRCUIT SEMICONDUCTOR CHARACTERISTIC
MEASUREMENTS BY ESTABLISHING A PREDETERMINED VOLTAGE ACROSS
THE SEMICONDUCTOR AND AN EXTERNALLY CONNECTED IMPEDANCE
Filed Aug. 15, 1963
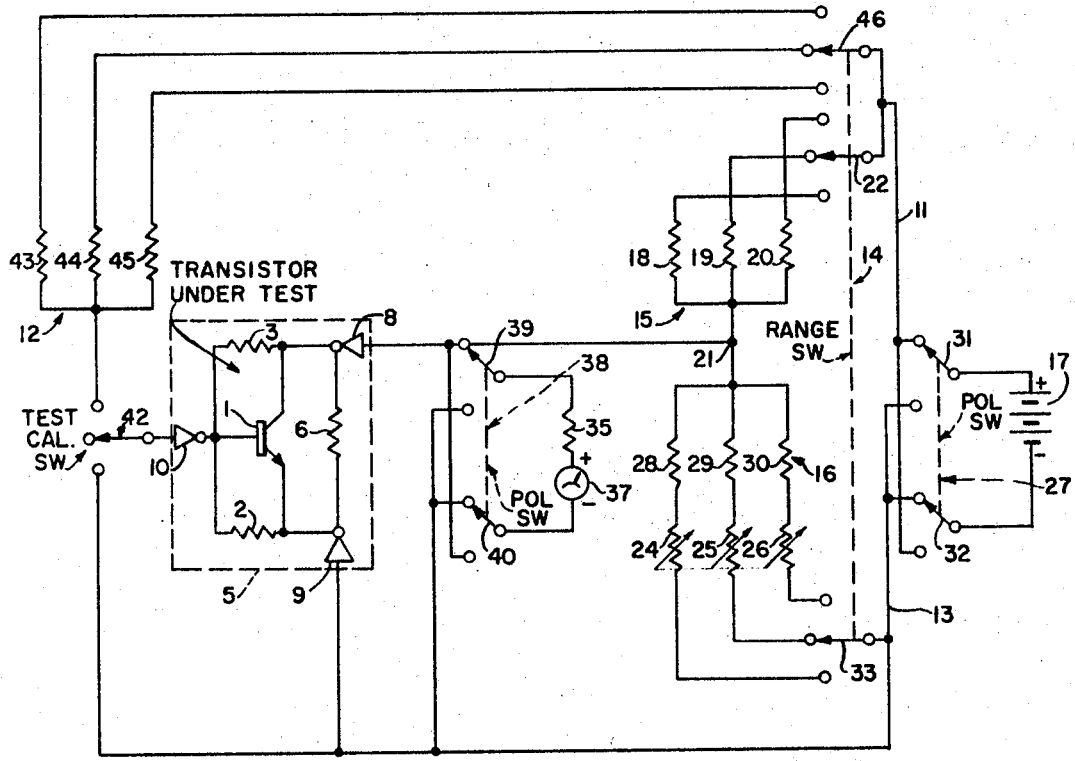
FIG. I.
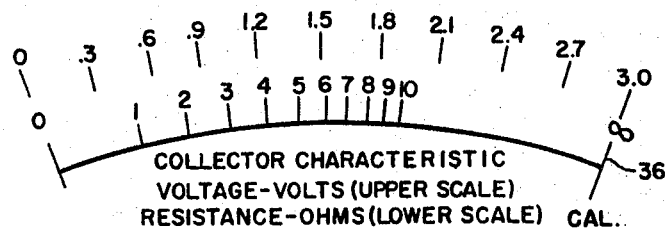
FIG. Ia.
INVENTOR
Louis W. Erath
BY
ATTORNEY

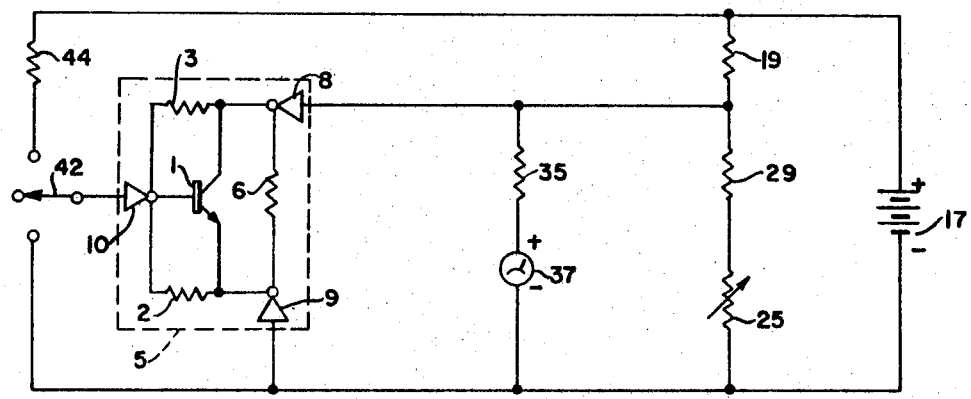
FIG. 2. NPN TRANSISTOR TEST
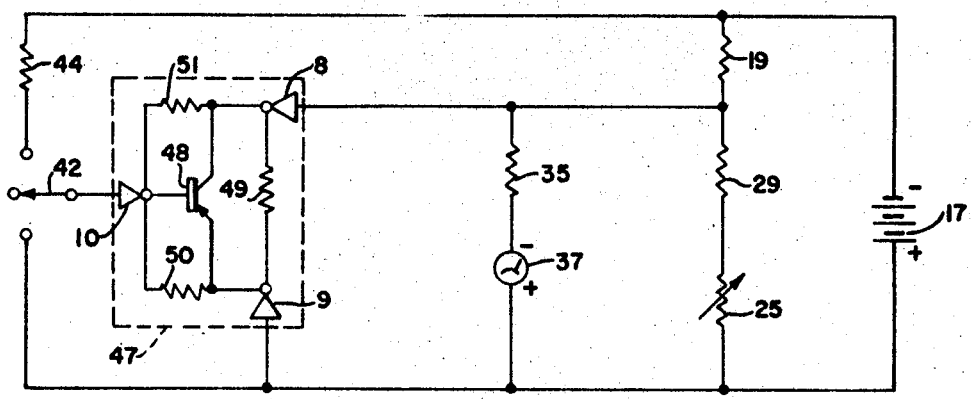
FIG. 3. PNP TRANSISTOR TEST
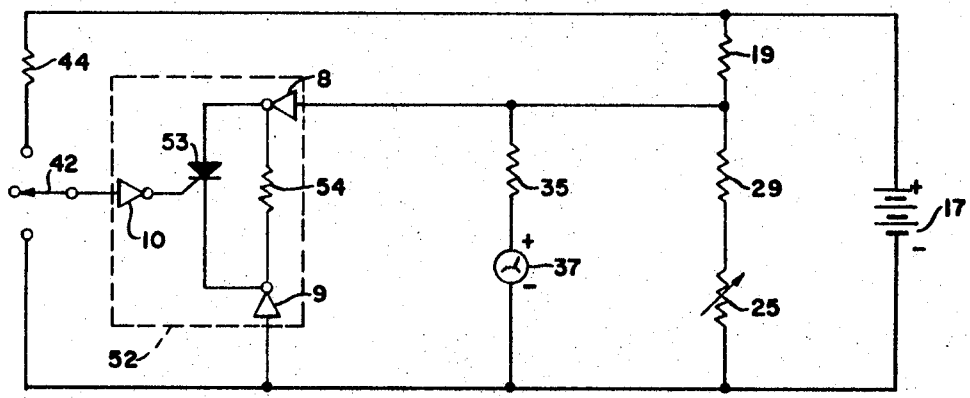
FIG. 4. CONTROLLED RECTIFIER TEST
INVENTOR
Louis W. Erath
BY *Arnold Roylance & Harris*
ATTORNEY

United States Patent Office 3,445,769
Patented May 20, 1969

3,445,769
METHOD AND APPARATUS FOR IN-CIRCUIT SEMICONDUCTOR CHARACTERISTIC MEASUREMENTS BY ESTABLISHING A PREDETERMINED VOLTAGE ACROSS THE SEMICONDUCTOR AND AN EXTERNALLY CONNECTED IMPEDANCE
Louis W. Erath, Houston, Tex., assignor to Test Equipment Corporation, Dallas, Tex., a corporation of Texas
Continuation-in-part of application Ser. No. 223,020, Sept. 12, 1962. This application Aug. 15, 1963, Ser. No. 302,356
Int. Cl. G01r
U.S. Cl. 324—158
14 Claims

ABSTRACT OF THE DISCLOSURE

A method for measuring characteristic parameters of a semiconductor which comprises the steps of placing an impedance in shunt with the semiconductor so that the combined impedance has a predetermined value and thereafter measuring the desired parameter while selectively controlling the current flowing through the semiconductor.

---

This application includes subject matter originally disclosed and claimed in copending application Ser. No. 223,020, filed Sept. 12, 1962, by Louis W. Erath, and now abandoned.

This invention relates to the testing of semiconductor devices and, more specifically, to methods and apparatus for testing semiconductor devices while connected in their associated circuits.

Semiconductor devices, such as transistors, controlled rectifiers and diodes, are substantially more rugged and reliable than the vacuum tubes which they usually replace. However, the life of a semiconductor device is not indefinite and therefore it is necessary to periodically determine if the device is operating properly. One group of meaningful tests which can be performed are referred to as the forward conductance tests which are conducted while the semiconductor device is either partially or fully conductive. These tests measure one or more of the forward conductance characteristics of the semiconductor device, such as the saturation impedance, the collector voltage for various conductive states, the cathode voltage of two element semiconductors, and the DC current gain.

Semiconductor devices, unlike vacuum tubes, cannot easily be removed from their associated circuit since they are usually soldered in place or otherwise permanently secured. If the semiconductor device is removed for out-of-circuit testing, it is doubtful that the test would be particularly meaningful, since damage to the device can easily occur during the subsequent installation. The same problem exists with regard to new components which show up as faulty after installation. In-circuit testing, that is, testing of the semiconductor device while it is connected in its associated circuit, has not been considered particularly feasible, since the in-circuit shunt impedance is usually unknown and may vary over a wide range.

An object of this invention is to provide methods and apparatus for measuring a meaningful characteristic of a semiconductor device without disconnecting the device from its associated circuit.

Another object is to provide methods and apparatus adjustable to compensate for the in-circuit shunt impedance connected across the semiconductor device while measuring a meaningful characteristic of the device.

Still another object is to provide relatively simple apparatus wherein a single meter is operative to indicate when the apparatus is properly adjusted to eliminate the effect of in-circuit shunt impedance, and also to measure a forward conducting characteristic of the semiconductors while connected in the circuit.

In order to perform meaningful tests on a semiconductor device while it is connected in a circuit, it is necessary to eliminate the effect of the unknown in-circuit shunt impedance connected across the terminals of the semiconductor device at which the test measurements are to be made. In accordance with the method of this invention, an adjustable external impedance is connected to these terminals. The external impedance is then adjusted so that the total shunt impedance across these terminals, i.e., the total impedance of the in-circuit impedance in parallel with the external impedance, is of a certain predetermined value. Thus, the total shunt impedance across the terminals at which measurements are to be made always has the same impedance value regardless of the in-circuit impedance value. Meaningful measurements can then be made by means of a measuring circuit calibrated to provide accurate indications with the predetermined impedance value connected across the test terminals.

In apparatus in accordance with the invention, the adjustable external impedance is connected in series with a fixed resistor and a known potential source to form a voltage divider network. The external impedance is connectable to the terminals of the semiconductor device at which the test measurements are to be made by means of suitable leads and a voltmeter is connected between the leads. The apparatus further includes circuits for selectively rendering the semiconductor device conductive or nonconductive. In the case of semiconductor devices having three or more terminals, the device is rendered nonconductive by shorting the control element to one of the noncontrol elements, and is rendered either fully or partially conductive, as desired, by applying the appropriate potential to the control element. In the case of two terminal semiconductors having a cathode and an anode, the device is rendered nonconductive, or back-biased, by applying the potential from the voltage divider network so that the cathode is positive with respect to the anode, and is rendered conductive by reversing the polarity of the applied potential.

It should be noted that when the external impedance is connected to the terminals of the semiconductor device, the external impedance is in parallel with the in-circuit shunt impedance. In accordance with the method of this invention, the external impedance is adjusted while the semiconductor device is nonconductive until a predetermined potential, referred to as the calibration potential, is indicated by the meter. The internal impedance of a semiconductor device is virtually infinite while the device is nonconductive and therefore this internal impedance has no significant effect. The potentials provided by the source, and the fixed resistor, have known values, and therefore it is known that the combined impedance of the in-circuit impedance connected in parallel with the external impedance must have the predetermined value when the calibration potential is indicated by the meter. Thereafter, the semiconductor device can be rendered conductive and the meter will accurately indicate the potential across the elements of the semiconductor device while conductive. The dial of the meter can also be graduated to accurately indicate the internal impedance of the semiconductor device while in a conductive state.

In order that the manner in which the foregoing and other objects of the invention are achieved can be understood in detail, reference is made to the following specification and drawings, the drawings forming a part of the specification, and wherein:

FIG. 1 is a schematic diagram illustrating one embodiment of the invention;

FIG. 1a illustrates the dial for the meter in FIG. 1 and the graduations thereon;

FIG. 2 is a simplified schematic diagram illustrating the test circuit connected to an NPN type transistor;

FIG. 3 is a simplified schematic diagram showing the test circuit connected to a PNP type transistor;

FIG. 4 is a simplified schematic diagram illustrating the test circuit connected to a controlled rectifier;

Figure 5:
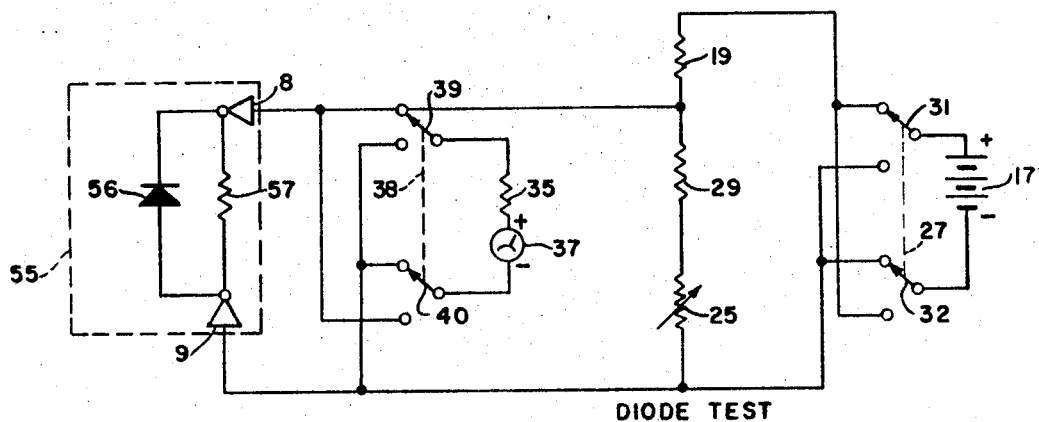
FIG. 5 is a simplified schematic diagram showing the test circuit connected to a semiconductor diode.

Some semiconductor devices, such as controlled rectifiers and semiconductor diodes, have only two operative states, namely, the fully conductive state and the fully nonconductive state. Other semiconductor devices, such as transistors, have an infinite number of conductive states, ranging between the fully nonconductive state and the fully conductive state where the device is operating in the saturated region. A transistor, for example, is operating in the saturated region when further increases in potential applied to the base have no further effect upon the conductive state of the transistor. If it is desired to test a transistor in a partially conductive state, it is necessary to accurately control the current entering the base of the transistor and therefore, in order to perform a meaningful in-circuit test, it is necessary to compensate for the in-circuit impedance connected to the base as well as the in-circuit impedance connected across the collector-to-emitter circuit where the characteristic of the transistor is usually measured. On the other hand, if it is only desired to test the transistor while in the fully conductive, or saturated, state, it is not necessary to compensate for the in-circuit impedance connected to the base, since an arbitrarily large potential, sufficient to drive the transistor into saturation, is merely applied to the base and the fact that a portion of the applied current is bypassed through the in-circuit impedance is immaterial.

The apparatus described in detail hereinafter is designed to measure only the saturation characteristics of semiconductor devices. It has been found that this apparatus is sufficient to provide an in-circuit test for practically any known semiconductor device. Not only is this apparatus the most practical embodiment of the invention, but it also is the clearest and simplest illustration of the concepts of the invention. It is pointed out, however, that the concepts of this invention have broad application to components testing generally and can easily be adapted by persons skilled in the art.

The measuring circuit shown in FIG. 1 is connected to a transistor circuit 5 including an NPN type transistor 1 which is to be tested. A resistor 2 is connected between the base and the emitter elements of the transistor, a resistor 3 is connected between the collector and base elements, and a resistor 6 is connected between the collector and emitter elements. These resistors are representative of various shunt in-circuit impedances which may be found connected to the transistor being tested. The measuring circuit is connected to the transistor under test by suitable connector probes 8, 9 and 10 which are connected to the collector, emitter and base elements, respectively, of transistor 1. Probes 8, 9 and 10 can be of any suitable type, such as alligator clips, or of the type described in copending applications Ser. No. 267,560, filed Mar. 25, 1963, by Louis F. Erath, and Ser. No. 268,297, filed Mar. 27, 1963, by Louis W. Erath and Richard Keyes, both applications now abandoned.

A group of resistors 15 is interconnected with another group of resistors 16 to provide three separate voltage dividers which can selectively be connected across a battery source of potential 17 by means of a three-position range switch 14. Thus, these resistors and the source provide a voltage divider network. More specifically, resistors 18, 19 and 20 are each connected at one end to a common junction 21, and at the other end to the separate stationary contacts associated with a movable contact 22 of range switch 14. One terminal of a battery 17 is connected to movable contact 22 via a movable contact 31 of a battery polarity reversing switch 27. A resistor 30 is connected in series with a variable resistor 26 and this series combination is connected between junction 21 and one of the stationary contacts associated with a movable contact 33 of range switch 14. In like fashion, resistors 28 and 29 are connected in series with variable resistors 24 and 25, respectively, and between junction 21 and the two remaining stationary contacts associated with movable contact 33.

Movable contact 33 is connected to the other terminal of battery 17 via movable contact 32 of the battery polarity reversing switch. Movable contact 32 is preferably ganged with movable contact 31 to provide a two-pole, two-position, polarity reversing switch 27. Junction 21 is connected to probe 8, and movable contact 32 connects probe 9 to one of the battery terminals. A meter circuit is connectable between probes 8 and 9 via a two-pole, two-position, meter polarity reversing switch 38. The meter circuit includes a DC voltmeter 37, which has a relatively high internal impedance. The positive terminal of meter 37 is connected to probe 8 via a resistor 35 and a movable contact 39, and the negative terminal of the meter is connected to probe 9 via a movable contact 40, when the polarity reversing switch 38 is in the position shown in FIG. 1. When the polarity reversing switch is moved to the other position, the positive terminal of meter 37 is connected to probe 9 and the negative terminal is connected to probe 8.

Test-calibrate switch 42 is a single-pole, three-position switch having the movable contact thereof connected to probe 10. The lower stationary contact (as viewed in FIG. 1) is connected to probe 9 and one of the terminals of battery 17 via movable contact 32 of polariy reversing switch 27. The upper stationary contact of switch 42 (as viewed) is connected to the other terminal of battery 17 via a group of resistors 12. More specifically, this upper contact is connected to the three stationary contacts associated with movable contact 46 of range switch 14 via resistors 43–45, respectively. Movable contact 46 is in turn connected to a terminal of battery 17 via movable contact 31 of polarity reversing switch 27.

Movable contacts 22, 33 and 46 are ganged together to form a three-pole, three-position range switch 14. The range switch is operative to selectively connect certain ones of the resistors in groups 12, 15 and 16 into the measuring circuit so as to provide selected values of base and collector current for the semiconductor under test. Movable contact 31 is ganged with movable contact 32 to provide a polarity reversing switch 27. The stationary contacts associated with switch 27 are interconnected so that the positive terminal of battery 17 is connected to movable contacts 46 and 22 via conductor 11, and so that the negative terminal of battery 17 is connected to movable contact 33 and probe 9 via conductor 13, when the switch is in the position shown in FIG. 1. When the switch is in the opposite position from that shown, the negative terminal of battery 17 is connected to conductor 11 and the positive terminal is connected to conductor 13.

The dial for meter 37 is shown in FIG. 1a. The dial includes an upper scale which is calibrated in collector saturation voltage, and a lower scale which is calibrated in collector saturation resistance. The dial also includes a calibration mark 36 corresponding to the full scale deflection of the meter.

The operation of the measuring circuit shown in FIG. 1 can more clearly be understood by referring to FIG. 2, which is a simplified schematic diagram including only those elements which are essential for testing an NPN type transistor. The FIG. 2 diagram is arrived at when switches 14, 27 and 38 are in the positions shown in FIG. 1.

The first step in the operation of the measuring circuit is to calibrate the circuit so that the total shunt impedance across the collector and emitter of transistor 1 is equal to a certain predetermined impedance value. This is accomplished by moving switch 42 to the lower position, referred to as the calibration position, so that the base of transistor 1 is connected directly to the emitter. Under these circumstances, the transistor is nonconductive and therefore the internal impedance between the collector and emitter is virtually infinite. Variable resistor 25 is then adjusted to achieve a full scale deflection on meter 37 or, in other words, a deflection corresponding to calibration mark 36 (FIG. 1a). The potential provided by battery 17, and the resistance of resistor 19, are known values. Therefore, the full scale indication provided by meter 37 indicates the value of the remaining impedance connected in series with the battery and resistor 19 must have a certain predetermined value. When transistor 1 is nonconductive, this remaining impedance includes the incircuit shunt impedance, mainly resistor 6, in parallel with resistors 29 and 25. Thus, the total impedance between the collector and emitter of transistor 1 has a certain predetermined value, regardless of the incircuit impedance value, when resistor 25 is adjusted to obtain a full scale deflection on meter 37.

After the circuit has been calibrated by adjusting resistor 25, switch 42 is moved to the upper position to permit current flow from the positive terminal of the battery through resistor 44 and the base-emitter circuit of transistor 1 to the negative terminal of the battery. This current flow renders the transistor conductive, reducing the collector-emitter impedance of the transistor and thereby reducing the voltage appearing across meter 37. By means of appropriate calibration on the dial of meter 37, as shown in FIG. 1a, meter 37 will directly indicate the collector-emitter voltage of the transistor and the collector-emitter impedance.

Referring again to FIG. 1, it should be noted that range switch 14 permits three different sets of resistors in groups 12, 15 and 16 to be connected into the measuring circuit so that the proper amount of current can be applied in accordance with the size of the transistor under test. Resistors in groups 15 and 16 determine the collector current supplied. The predetermined impedance between the collector and emitter of the transistor provided after appropriate adjustment of the respective resistors 24–26 is different on each of the ranges, but is of the appropriate value to provide accurate indications on meter 37. It should be noted that variable resistors 24–26 are ganged so that a single calibration adjustment will automatically calibrate the measuring circuit on all three ranges, thereby permitting the operator to switch from range to range without again calibrating the circuit. The resistors in group 12 control the base current supplied to the transistor. By selecting the appropriate resistor, sufficient current can be supplied to drive the transistor into the saturated region even though a portion of the applied current bypasses the transistor through the incircuit impedance. The range switch shown in FIG. 1 is a three-position range switch, but it should be obvious that any number of additional positions might be added to provide any number of desired test parameters.

The measuring circuit illustrated in FIG. 1 can be used to test virtually any type of known semiconductor device. Semiconductor devices with three or more terminals generally have a control element and at least two noncontrol elements. The control element is usually operative with respect to an associated one of the noncontrol elements. With transistors, for example, the base is the control element, the emitter is the associated noncontrol element, and the collector is the remaining noncontrol element. With controlled rectifiers, the gate element is the control element, the anode is the associated noncontrol element and the cathode is the remaining noncontrol element. When testing semiconductor devices with three or more terminals, probe 10 is connnected to the control element, probe 9 is connected to the associated noncontrol element, and probe 8 is connected to the remaining noncontrol element.

FIG. 3 is a simplified schematic diagram illustrating the measuring circuit connected to a transistor circuit 47 including a PNP type transistor 48. This measuring circuit is derived when range switch 14 is in the position shown in FIG. 1, and polarity reversing switches 27 and 38 are in their lower positions, i.e., the opposite positions from those shown in FIG. 1. Thus, the measuring circuit in FIG. 3 is essentially the same as that in FIG. 2, except for the polarity reversals and thus provides the appropriate potentials for testing a PNP type transistor. A resistor 50 is connected between the emitter and base of transistor 48, a resistor 49 is connected between the collector and emitter of the transistor and a resistor 51 is connected between the collector and base of the transistor. Resistors 50, 49 and 51 represent the various incircuit impedances which may be found connected across the transistor to be tested.

The measuring circuit is calibrated by moving movable contact 42 to the lower calibrate position thereby connecting the base of transistor 48 to the emitter so that the transistor is maintained in a nonconductive state. While the transistor is nonconductive, resistor 25 is adjusted to achieve a full scale deflection on meter 37 so that the total collector to emitter shunt impedance across transistor 48 has a predetermined value. Thereafter, movable contact 42 is moved to the upper position to test the transistor. This permits base current to flow through he transistor from the positive terminal of battery 17 through probe 9, the emitter-base circuit of the transistor, probe 10 and resistor 44. Resistor 44 is selected of a value which permits sufficient base current to flow through the transistor to drive the transistor into the saturated conductive region. This causes collector current to flow through the transistor from the positive terminal of battery 17 through probes 8 and 9, and resistor 19, causing a corresponding deflection on meter 37 if the transistor properly becomes conductive. The indication on meter 37 is a measure of the saturation collector-emitter impedance and voltage.

FIG. 4 is a simplified schematic diagram showing the measuring circuit connected to a controlled rectifier circuit 52, including a controlled rectifier 53 which is to be tested. A resistor 54 is connected between the anode and cathode of the controlled rectifier and represents the incircuit shunt impedance. Probe 8 is connected to the anode, probe 9 is connected to the cathode, and probe 10 is connected to the gate element. Range switch 14 and polarity reversing switches 27 and 38 are in the positions shown in FIG. 1.

A controlled rectifier is a PNPN type of semiconductor device which is internally regenerative. The controlled rectifier is initially nonconductive and blocks current in either direction but is rendered conductive by applying a positive potential at the gate element with respect to the anode. Once rendered conductive, the controlled rectifier remains conductive as long as the anode is positive with respect to the cathode.

The measuring circuit in FIG. 4 is calibrated by having movable contact 42 in the lower position at the time the probes are connected to the controlled rectifier. Under these circumstances, the controlled rectifier will remain in the initial nonconductive state to permit appropriate adjustment of resistor 25 to compensate for the in-circuit impedance. Thus, resistor 25 is adjusted until a full scale deflection appears on meter 37, i.e., until the meter indication corresponds to the calibration mark on the dial. Thereafter, movable contact 42 is moved to the upper test position so that a positive potential is applied to the controlled rectifier gate element via resistor 44. This renders the controlled rectifier conductive and meter 37 appropriately indicates the saturation voltage and impedance under conductive conditions.

The measuring circuit shown in FIG. 1 is also operative to test two-element semiconductor devices such as semiconductor diodes. The diode under test is first reversed biased with the applied potential being positive at the cathode with respect to the anode during calibration of the measuring circuit. Thereafter, the diode is forward biased, i.e., the applied potential is positive at the anode with respect to the cathode, so that the forward conductance characteristic of the diode can be measured while the diode is connected in the circuit.

FIG. 5 is a simplified schematic diagram showing the measuring circuit connected to a diode circuit 55 including a semiconductor diode 56 which is to be tested. Resistor 57 is connected between the terminals of diode 56 and represents the total in-circuit shunt impedance. Probe 8 is connected to the cathode of diode 56 and probe 9 is connected to the anode.

When polarity reversing switch 27 is in the position shown in FIG. 5, the positive terminal of battery 17 is connected to the cathode of diode 56 via movable contact 31 and resistor 19, and the negative terminal of the battery is connected to the anode of diode 56 via movable contact 32. Under these circumstances, diode 56 is reverse biased and therefore nonconductive. The positive terminal of meter 37 is connected to probe 8 via movable contact 39 and negative terminal of the meter is connected to probe 9 via movable contact 40 when polarity reversing switch 48 is in the position shown in FIG. 5. The measuring circuit is then calibrated by adjusting resistor 25 until a full scale deflection appears on meter 37, i.e., until the meter indication corresponds to the calibration mark on the dial. Thus, when resistor 25 is appropriately adjusted in this manner, the total combined shunt impedance across the diode (resistor 57 in parallel with resistors 29 and 25) has a predetermined known value.

The forward conductance characteristic of diode 56 can then be measured by moving polarity reversing switches 27 and 38 to the lower positions, i.e., opposite to those shown in FIG. 5. Under these circumstances, the negative terminal of battery 17 is connected to the cathode of diode 56 via movable contact 32 and resistor 19, whereas the positive terminal of the battery is connected to the anode of diode 56 via movable contact 31. The diode is therefore forward biased and becomes conductive. Meter 37 is connected across probes 8 and 9 with the proper polarity, and therefore measures the forward conducting impedance and voltage of diode 56.

Figure 6:
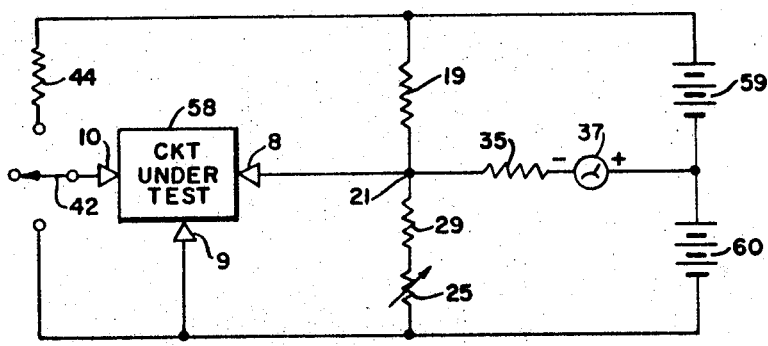
FIG. 6 is a schematic diagram illustrating another embodiment of the invention.

For some installations, it may be desirable that the calibration point on the meter be at a zero deflection instead of the full scale deflection. This can be accomplished by a slight modification of the circuit as shown in FIG. 6 where the meter circuit is connected between the midpoint on the voltage divider and the midpoint on the battery instead of being across a portion of the voltage divider. This modified circuit is illustrated in FIG. 6 by way of a simplified schematic diagram including many components similar to those previously described with respect to FIG. 1. Probes 8, 9 and 10 of the measuring circuit are shown connected to a circuit under test 58. The negative terminal of meter 37 is connected to junction 21 between resistors 19 and 29 of the voltage divider via resistor 35. Instead of using a single battery, the battery is shown as including two separate batteries 59 and 60 connected in series aiding relationship. The positive terminal of meter 37 is connected to the junction between the batteries. The positive terminal of battery 59 is connected to resistor 19 and the negative terminal of battery 60 is connected to variable resistor 25.

Figure 6A:
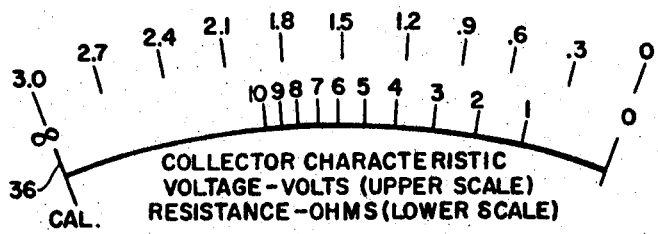
FIG. 6a illustrates the dial for the meter in the FIG. 6 circuit and the graduations thereon.

The measuring circuit is appropriately calibrated when variable resistor 25 is adjusted so that a preselected voltage appears across resistors 29 and 25, since these are the resistors in parallel with the in-circuit shunt impedance. If the potential across battery 60 is equal to the preselected voltage desired across resistors 29 and 25, meter 37 will have a zero indication when the circuit is properly calibrated. Thus, with the circuit in FIG. 6, the dial would appear as shown in FIG. 6a with the calibration mark 36 at the left or at the zero deflection point. Graduations on the dial are such that the meter will indicate resistance and voltage values measured across the noncontrol elements of the semiconductor device under test.

While only a few illustrative embodiments of the invention have been shown and described in detail, it should be obvious that there are numerous variations within the concepts set forth in the specification. The invention is more particularly defined in the appended claims.

What is claimed is:

1. In a method of measuring a forward conductance characteristic of a semiconductor device connected in a circuit having an unknown in-circuit impedance, said device including at least two test terminals at which the forward conductance characteristic measurement is to be made, the steps of:
   rendering said device nonconductive so that the internal impedance of said device becomes relatively high between said test terminals,
   connecting an external shunt impedance across said test terminals,
   applying an electrical energy source to said test terminals to thereby establish current flow at least through said external shunt impedance while said device is rendered nonconductive,
   measuring the potential drop across said test terminals,
   selecting a value for said shunt impedance while said device is nonconductive so that said potential drop has a predetermined value,
   rendering said device at least partially conductive after said shunt impedance has been selected, and
   measuring said forward conductance characteristic of said device with said selected value of said shunt impedance connected across said test terminals thereby compensating for the effects of said unknown in-circuit impedance.

2. The method of claim 1 wherein said forward conductance characteristic is the saturation characteristic of said device.

3. The method of claim 1 wherein said current is derived from a voltage divider network having a DC energy source connected thereacross.

4. The method of claim 3 wherein said external shunt impedance forms part of said voltage divider network.

5. The method of claim 1 wherein,
   said semiconductor device is at least a three-terminal device having a control element and a pair of noncontrol elements, and
   said test terminals are connected to said noncontrol elements.

6. The method of claim 5 and further including the steps of:
   applying sufficient potential to said control element so that additional increases in the applied potential will not materially change the conductive state of said semiconductor device, and
   measuring the potential between said test terminals to derive an indication of the saturation characteristic of said device.

7. The method of measuring a forward conductance characteristic of a two terminal semiconductor device having an anode and a cathode while the semiconductor device is connected in a circuit, comprising the steps of
   connecting a variable impedance, which forms part of a voltage divider network, across the semiconductor device so that the applied potential is positive at the cathode with respect to the anode to thereby back-bias the semiconductor device and render the same nonconductive;

adjusting said variable impedance while the semiconductor device is nonconductive so that a predetermined potential appears across the semiconductor device thereby compensating for the effect of any in-circuit shunt impedance;

thereafter reconnecting said voltage divider network so that the applied potential is positive at the anode with respect to cathode to thereby render the semiconductor device conductive; and then measuring the potential across said semiconductor device to derive an indication representative of a forward conductance characteristic.

8. Apparatus for measuring a forward conductance characteristic of a semiconductor device while connected in a circuit, comprising:

a pair of leads connectable to at least two terminals of the semiconductor device;

a meter connected between said leads, a voltage divider network including a variable resistance, said variable resistance being connected between said leads and adjustable while the semiconductor device is nonconductive to obtain a preselected indication on said meter to thereby compensate for the effect of any in-circuit impedance connected to the semiconductor device; and means connected to said device for rendering the semiconductor device nonconductive before and conductive after said variable resistance has been adjusted so that said meter will provide an indication representative of a forward conductance characteristic of the semiconductor device.

9. Apparatus in accordance with claim 8 wherein said voltage divider network includes a DC source of potential, and a fixed resistor connected in series with said variable resistance, the series combination of said fixed resistor and said variable resistance being connected across said source.

10. Apparatus in accordance with claim 8 wherein said means for rendering the semiconductor device conductive is operative to supply sufficient potential to insure that the semiconductor device is operating in the saturated region regardless of any in-circuit impedance connected to the semiconductor device.

11. Apparatus in accordance with claim 8 wherein said voltage divider network includes a DC source of potential, a fixed resistor connected in series with said variable resistance; and a polarity reversing switch for connecting the series combination of said fixed resistor and said variable resistance across said source.

12. Apparatus for measuring a forward conductance characteristic of a semiconductor device having at least a control element and a pair of noncontrol elements while the semiconductor device is connected in an associated circuit, comprising:

a pair of leads connectable to the noncontrol elements of the semiconductor device;

a third lead connectable to the control element of the semiconductor device;

circuit means including a DC energy source connected to said third lead and selectively operable to render the semiconductor device nonconductive by connecting said third lead to one of said pair of leads, or to render the semiconductor device conductive by applying a potential to said third lead;

a meter connected between said pair of leads; and a voltage divider network including a variable resistor, said variable resistor being connected between said pair of leads and being adjustable while the semiconductor device is nonconductive to obtain a preselected indication on said meter to thereby compensate for the effect of any in-circuit impedance between said pair of leads when connected to the semiconductor device;

said meter being operative to provide an accurate indication representative of a forward conductance characteristic of the semiconductor device after said variable resistance has been adjusted, and said semiconductor device is rendered conductive.

13. Apparatus for measuring the saturation characteristics of a semiconductor device while connected in a circuit, comprising:

a source of direct current potential;

a plurality of voltage dividers including means for selectively connecting said voltage dividers across said source, each of said voltage dividers including a variable resistance;

a pair of leads for connecting, across the semiconductor device, that one of the variable resistances associated with the voltage divider connected across said source;

a meter connected between said leads;

means coupled to said semiconductor device for rendering the semiconductor device nonconductive so that the variable resistance connected across the semiconductor device can be adjusted to achieve a preselected indication on said meter to thereby compensate for the effect of any in-circuit impedance; and means for rendering the semiconductor device conductive after said variable resistance has been adjusted so that said meter will provide an indication in accordance with a saturation characteristic of the semiconductor device.

14. Apparatus in accordance with claim 13 wherein said plurality of adjustable resistances are mechanically interconnected so that all of said variable resistances are adjusted simultaneously.

References Cited

UNITED STATES PATENTS

| | | | |
|---|---|---|---|
| 2,922,954 | 1/1960 | Bigelow | 324—158 |
| 3,227,953 | 1/1966 | Cerveny | 324—158 |

OTHER REFERENCES

G.E. Transistor Manual (sixth edition), March 20, 1962, page 232.

Proceedings of the IRE, November 1956, page 1544.

Motorola Power Transistor Handbook (first edition), 1961, pages 32, 33.

Radio Electronics, vol. 32, No. 9, September 1961, pages 66–68.

Motorola Power Transistor Handbook (first edition), 1961, pages 159, 160.

RUDOLPH V. ROLINEC, *Primary Examiner.*

E. L. STOLARUN, *Assistant Examiner.*